United States Patent
Capadouca

(10) Patent No.: US 7,752,093 B2
(45) Date of Patent: Jul. 6, 2010

(54) SALES TRANSACTION HUB

(75) Inventor: Christopher Allan Capadouca, Chaska, MN (US)

(73) Assignee: Accenture Global Services GmbH, Schaffhausen (CH)

( * ) Notice: Subject to any disclaimer, the term of this patent is extended or adjusted under 35 U.S.C. 154(b) by 118 days.

(21) Appl. No.: 12/040,213

(22) Filed: Feb. 29, 2008

(65) Prior Publication Data
US 2008/0215465 A1 Sep. 4, 2008

Related U.S. Application Data

(60) Provisional application No. 60/892,384, filed on Mar. 1, 2007.

(51) Int. Cl.
*G07B 17/00* (2006.01)
*G07F 19/00* (2006.01)

(52) U.S. Cl. .............................. 705/30; 705/11; 705/14; 705/21; 705/31

(58) Field of Classification Search ................... 705/14, 705/30, 7, 50, 53, 31, 24; 707/101, 102
See application file for complete search history.

(56) References Cited

U.S. PATENT DOCUMENTS

| | | | | |
|---|---|---|---|---|
| 4,328,544 | A * | 5/1982 | Baldwin et al. | 705/24 |
| 5,274,547 | A * | 12/1993 | Zoffel et al. | 705/38 |
| 5,499,367 | A * | 3/1996 | Bamford et al. | 1/1 |
| 5,832,458 | A * | 11/1998 | Jones | 705/14.26 |
| 6,286,098 | B1 * | 9/2001 | Wenig et al. | 713/151 |
| 7,083,092 | B2 * | 8/2006 | Nakamura | 235/383 |
| 7,383,230 | B2 * | 6/2008 | Wolff | 705/53 |
| 7,409,370 | B2 * | 8/2008 | Aissi | 705/50 |
| 2005/0097149 | A1 * | 5/2005 | Vaitzblit et al. | 707/202 |
| 2005/0234963 | A1 * | 10/2005 | Capps et al. | 707/102 |
| 2005/0261995 | A1 * | 11/2005 | Phelan | 705/31 |
| 2005/0289024 | A1 * | 12/2005 | Hahn-Carlson et al. | 705/30 |
| 2006/0010165 | A1 * | 1/2006 | Gee | 707/104.1 |
| 2006/0036538 | A1 * | 2/2006 | Griffis et al. | 705/39 |
| 2006/0149671 | A1 * | 7/2006 | Nix et al. | 705/40 |
| 2006/0282448 | A1 * | 12/2006 | Schneider et al. | 707/101 |

(Continued)

OTHER PUBLICATIONS

James Thornton. (Oct. 2004). Argument rages over curbing coupon fraud. Promotions & Incentives,11-12. Retrieved Apr. 28, 2010, from ABI/INFORM Global.*

(Continued)

*Primary Examiner*—Matthew S Gart
*Assistant Examiner*—Olusegun Goyea
(74) *Attorney, Agent, or Firm*—Fish & Richardson P.C.

(57) ABSTRACT

In a computer-implemented method for processing a sales transaction, an un-audited sales transaction is received from a sale generator, and temporarily stored in a memory location and forwarded to a transaction auditor to audit the sales transaction and to a plurality of backend processors to begin processing the sales transaction. An audited sales transaction is received from the transaction auditor, where the audited sales transaction is an audited version of the un-audited sales transaction. The audited sales transaction is correlated with the un-audited sales transaction using the temporarily stored un-audited sales transaction, and a resultant sales transaction that includes information from the audited sales transaction is generated. The resultant sales transaction is transmitted to the plurality of backend processors to continue processing the sales transaction.

20 Claims, 5 Drawing Sheets

U.S. PATENT DOCUMENTS

2007/0011014 A1* 1/2007 Umapathy .................... 705/1
2008/0154676 A1* 6/2008 Suk .............................. 705/7

OTHER PUBLICATIONS

St. John, Premier Fashion Retailer to Grow Business With Connected Retailer Suite. (Sep. 14). PR Newswire,1. Retrieved Apr. 28, 2010, from Business Dateline.*

Coscia, Albert. (Jan. 18). Merchant Bank Services introduces posport —new payment card authorization device. PR Newswire,(1) 1. Retrieved Apr. 28, 2010, from Business Dateline.*

Business/Technology Editors. (Jan. 18). More than 40 retailers have selected STS Open AuditWorks; Proven solution manages store-level consumer transactions. Business Wire, 1. Retrieved Apr. 28, 2010, from Business Dateline.*

European Search Report dated May 7, 2008 (10 pages).

* cited by examiner

SALES TRANSACTION HUB

CROSS-REFERENCE TO RELATED APPLICATION

This application claims benefit under 35 U.S.C. §119(e) of U.S. Provisional Application Ser. No. 60/892,384, filed on Mar. 1, 2007, and entitled "Sales Transaction Hub," the contents of which are hereby incorporated by reference in its entirety.

TECHNICAL FIELD

This document relates to processing sales transactions.

BACKGROUND

Many businesses today sell products or services through a number of different avenues. Traditional "brick-and-mortar" retail establishments remain popular, and catalog orders received by phone continue to provide significant sales revenue for many businesses. Online sales over the Internet represent a growing fraction of many businesses' revenue streams as increasing numbers of consumers gain access to the Internet and become comfortable purchasing products online. Additionally, some businesses may be subdivided into several divisions, each of which may sell inventory, and some larger businesses may own subsidiary businesses that may also offer multiple ways of purchasing goods or services. Methods of payment for goods or services at each of these different business channels or brands may also vary. For example, while consumers purchasing over the phone or online may typically pay with a credit card or a gift card, consumers at a retail location may additionally pay with cash, a check, reward points, or some combination of the above. Financing arrangements can also be used when selling merchandise.

Despite offering a number of different brands or channels for originating sales transactions, a business may desire a single processing system for managing the transactions. Within the processing system, however, many different subsystems may operate on the sales transactions. Additionally, some of the subsystems may operate on transactions initially, and may perform initial or intermediate processing on the transactions, while other subsystems may operate on the transactions after the initial processing, the intermediate processing, or both, has been performed. Some subsystems may operate on the transactions both before processing has been performed and after processing has been performed. In this case, the subsystems must determine how the transaction has changed as a result of the earlier processing.

The processing system may grow larger over time as additional capability is added to the system, or as the business acquires other businesses and incorporates their systems into its processing system. As this occurs, complexity may be introduced as more and more subsystems are forced to interface with one another. Differences in preferred formats can cause incompatibilities. Individual subsystems may also have difficulty reconciling the various transactions and the various states of processing for the transactions across the multiple subsystems as system complexity increases, which may compromise data integrity.

SUMMARY

Systems and methods for processing sales transactions and managing a sales processing system are disclosed.

In a general aspect, a computer-implemented method of processing a sales transaction includes receiving an un-audited sales transaction from a sale generator, and temporarily storing the un-audited sales transaction in a memory location and forwarding the un-audited sales transaction to a transaction auditor to audit the sales transaction and to a plurality of backend processors to begin processing the sales transaction. The method also includes receiving from the transaction auditor an audited sales transaction, the audited sales transaction being an audited version of the un-audited sales transaction. The method further includes correlating the audited sales transaction with the un-audited sales transaction using the temporarily stored un-audited sales transaction, generating a resultant sales transaction that includes information from the audited sales transaction, and transmitting the resultant sales transaction to the plurality of backend processors to continue processing the sales transaction.

In various implementations, the un-audited sales transaction may include an identifier that indicates an association between the sales transaction and a business unit. The sales transaction may be represented by an electronic document having fields for information pertaining to the sales transaction. Un-audited sales transactions may be received from a plurality of different sales generators. Each sales generator in the plurality different sales generators may be associated with a different business unit. The computer-implemented method may further include updating an audit log with information pertaining to the sales transaction. The computer-implemented method may further include assessing the received un-audited sales transaction to determine whether one or more sales transactions are missing. Assessing the received un-audited sales transaction may include comparing a transaction number associated with the received un-audited sales transaction with one or more transaction numbers associated with previously received sales transactions. The computer-implemented method may further include reconstructing a missing sales transaction. Correlating the audited sales transaction with the un-audited sales transaction can include identifying one or more differences in the audited sales transaction as compared to the un-audited sales transaction. The resultant sales transaction may be the audited sales transaction. The un-audited sales transaction may be translated from a first format associated with the sales generator to a second format. The computer-implemented method may further include receiving a second un-audited sales transaction from the sales generator, determining that the second un-audited sales transaction is also associated with the sales transaction, and aggregating the un-audited sales transaction and the second un-audited sales transaction into a single transaction document.

In another general aspect, a system for processing a sales transaction for a business includes a transaction loader module operable to receive an un-audited sales transaction document that is generated by an electronic sales generator and associated with a business unit of the business. The system also includes one or more back-end processors capable of receiving a sales transaction document and processing a sales transaction using the received sales transaction document. The system further includes a sales transaction processing module operable to receive an un-audited sales transaction document from the transaction loader module, temporarily store the un-audited sales transaction document in a memory location and forward the un-audited sales transaction document to a transaction auditor to audit the sales transaction and to the one or more backend processors to begin processing the sales transaction, receive from the transaction auditor an audited sales transaction document that is an audited version of the un-audited sales transaction document, correlate the audited sales transaction document with the un-audited sales transaction document using the temporarily stored un-audited sales transaction document, generate a resultant sales transaction document that includes information from the audited sales transaction document, and transmit the resultant sales transaction document to the one or more backend processors to continue processing the sales transaction.

Advantages of the methods and systems discussed herein may include one or more of the following: sales and order management systems may post sales transactions to a single point of accountability; a single point of reference for sales control totals may be established; the number of sales data feeds may be reduced; the number of interfaces between target systems relating to sales may be reduced or eliminated; the number of sales reconciliation functions may be reduced to a single function; the number of batch jobs per system may be reduced; a single system of record for performing settlement function may be realized; dependency on a data warehouse for near real-time un-audited (operational) sales information may be eliminated; an easier migration from a customized version of an auditing system may be provided; and un-audited information may be utilized in near real-time.

The details of one or more embodiments of the invention are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
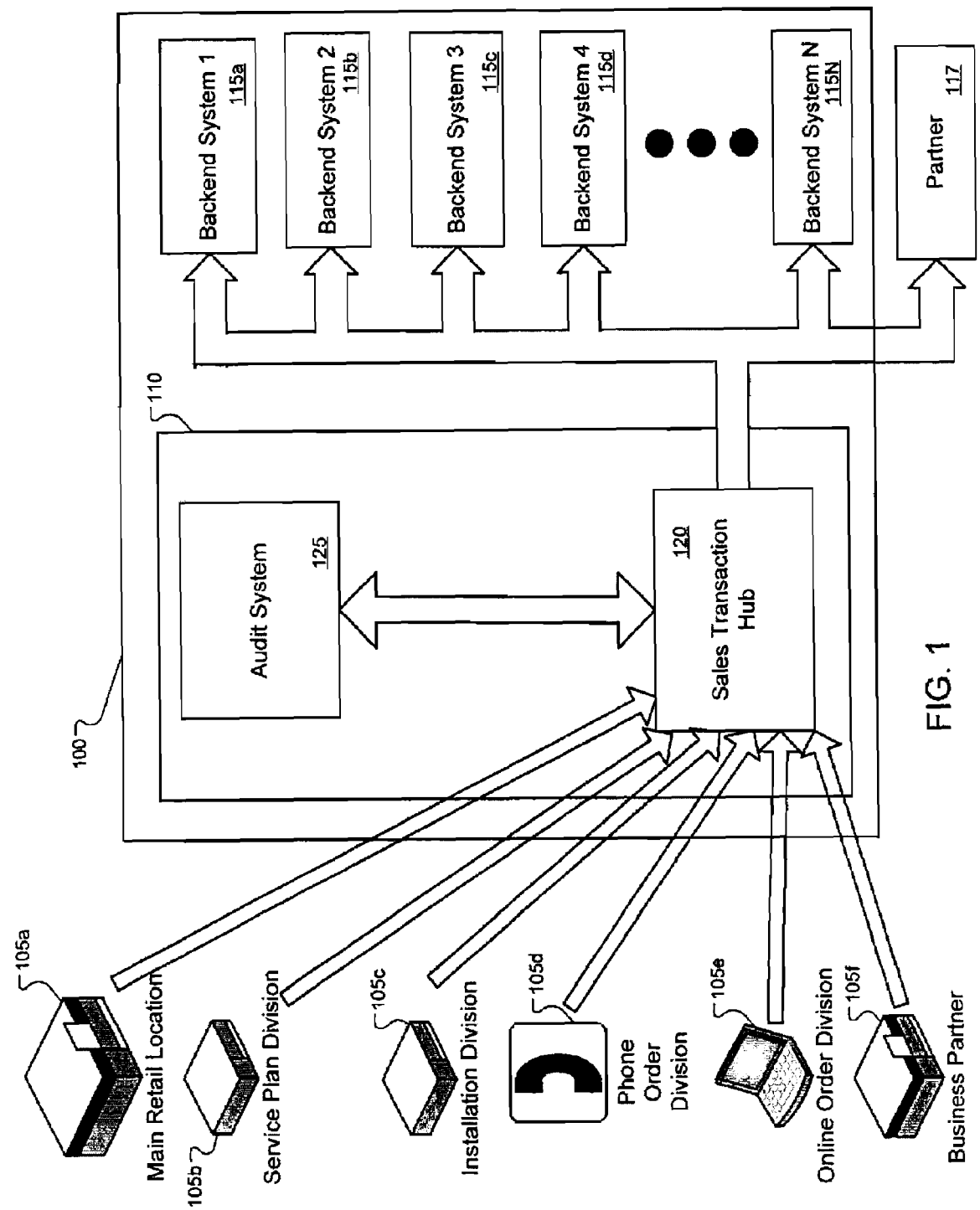
FIG. 1 is a block diagram of an exemplary sales transaction processing system that can be used to process sales transactions received from various units of a business.

FIG. 1 is a block diagram of an exemplary sales transaction processing system 100 that can be used to process sales transactions received from various units 105 of a business. Businesses may have several channels, brands, or partners 105, each of which may sell products or services to customers of the business. When such sales of products or services are consummated, representations of the sales transactions may be generated, and may include information pertaining to the product or service purchased, the customer, the channel, brand, or partner 105 associated with the sale, the method of payment including account numbers if appropriate, time and date information, as well as other information. The sales transaction processing system 100 may receive and process the sales transactions, as will be described in more detail below. Generally, the sales transaction processing system 100 may receive sales transactions and sales orders. For simplicity, this document will generally describe functionality associated with processing sales transactions, but sales orders may similarly be handled.

FIG. 1 shows a main retail location 105a, a service plan division 105b, an installation division 105c, a phone order division 105d, an online order division 105e, and a business partner 105f. FIG. 1 is exemplary, and any number of channels, brands, or partners 105 are may be included, including various business units associated with the business. Consider a business that sells home electronics equipment, for example. A customer visiting the main retail location 105a may browse through display aisles of merchandise, and may decide to purchase a plasma television, a set of home theater speakers, a DVD player, an audio/video receiver to control the home theater system, and speaker and interface cables to couple the components together, in this example. The customer may proceed to a checkout lane, and a cashier may scan machine-readable representations (e.g., barcodes) or otherwise enter identifiers associated with the items into an electronic sale generator, such as a cash register or order-entry system. The customer may then tender some form—e.g., cash, personal check, certified check, money order, credit card, gift card, etc.—and the electronic sale generator may create an electronic representation of the sales transaction. In an implementation, sales transactions may be represented by electronic documents, such as XML (extensible markup language) documents. The document may include fields for information pertaining to the sales transaction. In some implementations the sales transactions may be database objects, and each sale transaction may be represented by an instance of the database object. Hereafter for simplicity, representations of sales transactions within the sales transaction processing system 100 will be referred to as sales transaction documents, or simply as sales transactions.

Similarly, the customer might purchase one or more extended service plans for the components purchased, and may purchase an installation package, whereby an installer agrees to visit the customer's home to install and configure the home theater system. The service plans may be offered through the service plan division 105b of the business, and the installation package may be offered through the installation division 105c of the business. In some implementations, the consumer may purchase the service plans and the installation package at the same time as the merchandise, while in other implementations they may be purchased separately. A first sales transaction document that corresponds to the merchandise purchased by the customer may be generated by the sales generator. Second and third sales transaction documents that correspond to the one or more extended service plans and the installation package, respectively, may also be generated. In some implementations, the second and third sales transaction documents, associated respectively with the service plan division 105b and the installation division 105c, may be generated by the same sales generator (e.g., the same cash register) that generated the first sales transaction document, which was associated with the main retail location 105a in this example. An identifier in the scanned code or entered by a user may indicate the association of the sales transaction with the appropriate business unit 105, according to an implementation. In other implementations, the different sales transaction documents may be generated by more than one sales generator.

When the customer arrives home, flush with excitement over the purchase of the home theater system, the customer may notice a catalog produced by the business, and may call a phone number listed in the catalog and order one or more DVDs. An operator or an order-receiving system may receive the telephone order for the DVDs, including accepting a payment for the products (such as a credit card number, debit card number, or gift card number), and a sales generator may generate a sales transaction document corresponding to the DVD order. This sales transaction may be associated with the phone order division 105d. The customer may then access the business's web site, for example, and may enter an online store feature of the web site. The customer may peruse the offerings available through the business's online store, and may decide to order a high-definition satellite television subscription package to complement the day's earlier purchases. The customer may select an appropriate subscription package from among options listed on the website, and may offer a form of payment (such as a credit card number, gift card number, or bank account and routing number), and a sales generator may generate a sales transaction document corresponding to the satellite television subscription package. The sales transaction may be associated with the online order division 105e of the business.

In an implementation, the business may use third-party businesses to sell certain of the business's products or services. These third-party businesses may be referred to as business partners 105f, as they may generate sales orders for the business. For example, the business may offer gift cards for sale at a grocery store or convenience store 105f, to list just one example. The customer may recall that her sister's birthday is coming up, and may step-out to the convenience store 105f and purchase a gift card for the occasion. A sales generator associated with the business partner 105f may generate a sales transaction document corresponding to the gift card purchase, according to an implementation. As such, sales transaction documents may be generated and associated with any of the business's channels, brands, or partners 105. This may be advantageous in tracking performance of the various units, for example.

Generally, in an implementation, the sales transaction processing system 100 can be viewed as including front-end transaction collection systems (not shown in FIG. 1), an intermediate processing system 110, and back-end processing systems 115. The front-end transaction collection systems may receive sales transaction documents from sales generators, according to an implementation. In some implementations, the front-end transaction collection systems are one or more queues that receive the sales transaction documents and present them to the intermediate processing system 110. The front-end transaction collection systems may be located within the transaction processing system 100 in some implementations, but in other implementations one or more front-end transaction collection systems may be located at one or more of the business channels, brands, or partners 105. In some implementations, the queues are within the intermediate processing system 110, and receive the sales transaction documents into the intermediate processing system 110. In these implementations, the front-end transaction collection systems may be omitted.

In the exemplary implementation shown in FIG. 1, the intermediate processing system 110 includes a sales transaction hub 120 and an audit system 125. The sales transaction hub 120 may provide a single point of interface and a single point of accountability for all sales-related information within the sales transaction processing system 100, according to an implementation. In an implementation, the sales transaction hub 120 may receive all of the sales transaction documents from the front-end transaction collection systems, or from the various business units 105, as shown in the example of FIG. 1. The sales transaction hub 120 may receive sales transaction documents in real time, or may receive them at some later time, such as in a batch of transactions. In some implementations, the sales transaction hub 120 may receive sales transactions directly from point of sale systems, order capture systems, or order management systems, such as one or more of the business's channels, brands, or partners 105. The sales transactions received by the sales transaction hub 120 in this fashion are un-audited because they have not yet been audited by the audit system 125.

The audit system 125 may provide auditing functions to the sales transaction processing system 100. In an implementation, the audit system 125 may receive un-audited sales transaction documents from the sales transaction hub 120, may audit the sales transactions by performing the auditing functions on the un-audited sales transaction documents, and may return the audited sales transaction documents to the sales transaction hub 120. Audit functions can include validity checks on the sales transactions, compliance checks on the sales transactions, and fraud checks on information associated with the sales transaction. Specific audits might include verifying that a credit card number associated with a sales transaction is within a specific credit card number range, or verifying that a purchase amount is not in excess of some predetermined value, to list just a couple of examples. As part of the audit process, one or more human auditors may investigate aspects of a sale transaction and may make adjustments to the transaction accordingly. In these cases, the audit of a particular sales transaction can take several days. In some implementations, an audit can remain open until the close of the financial period. Other or additional audit functions may be performed by the audit system 125. In some implementations, the audit system 125 may be a stand-alone module, and may be commercially available.

After receiving an un-audited sales transaction document from a front-end transaction collection system, the sales transaction hub 120 may store a copy of the un-audited sales transaction document in a memory location within the sales transaction hub 120, according to an implementation. The sales transaction hub 120 may then forward the un-audited sales transaction document to the audit system 125, as described above, and may also forward the document to one or more of the back-end processing systems 115 or to a partner system 117 (which may be outside of the transaction processing system 100), according to some implementations.

The back-end processing systems 115 or partner system 117 may perform specialized functions on sales data for the sales transaction processing system 100. Several back-end processing systems 115a, 115b, 115c, 115d, . . . , 115N are shown in the sales transaction processing system 100 of FIG. 1. In general, there may be any number of back-end processing systems 115 or partner systems 117 that may subscribe-to or receive information from the sales transaction hub 120. Examples of back-end processing systems 115 include a general ledger system (such as a financial system), a data warehouse system, a warranty system, a customer refund system, a loyalty or customer rewards system, an order management system, a retail merchandising system, an enterprise subscription capture system, a product support plan system, a product replacement plan system, a customer purchasing tracker system, settlement systems of various types, and business tracking systems, according to some implementations.

Each of the back-end processing systems 115 or partner systems 117 may subscribe to certain types of sales transactions through the sales transaction hub 120, and the sales transaction hub 120 may maintain a list of the subscriptions. In an implementation, some back-end processing systems 115 or partner systems 117 may subscribe only to un-audited sales transactions, whether from one or more particular channels, brands, or partners 105 or from all of the channels, brands, or partners 105. Other back-end processing systems 115 or partner systems 117 may subscribe only to audited sales transactions, whether from one or more particular channels, brands, or partners 105 or from all of the channels, brands, or partners 105. Still other back-end processing systems 115 or partner systems 117 may subscribe to both audited and un-audited sales transactions, whether from one or more particular channels, brands, or partners 105 or from all of the channels, brands, or partners 105, according to some implementations. In any case, the sales transaction hub 120 may provide documents representing the audited or un-audited sales transactions to the back-end processing systems 115 or partner systems 117, as will be described in more detail below. The back-end processing system 115 or partner systems 117 may then perform its specific function or functions on the received sales transactions, whether audited or un-audited.

Figure 2:
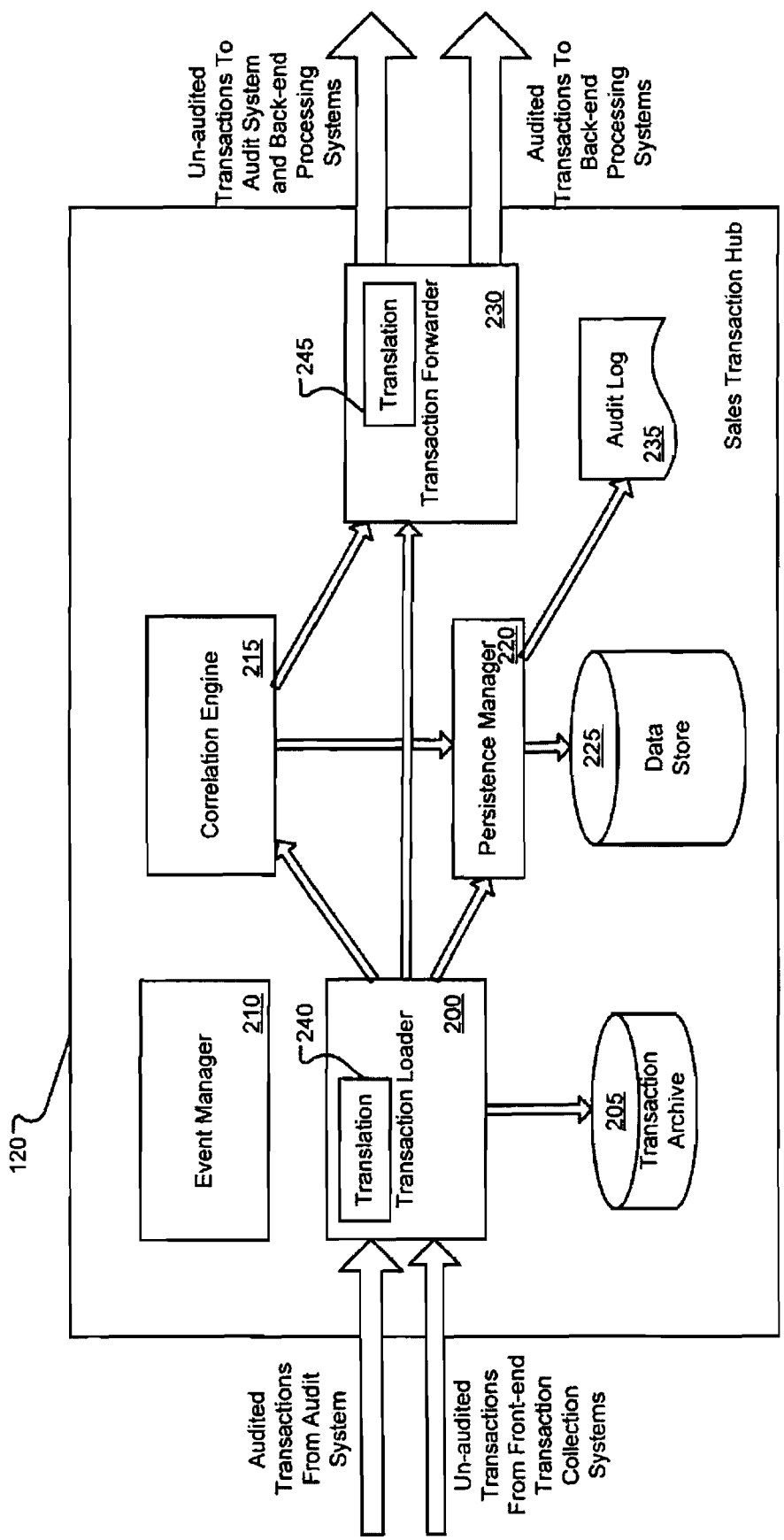
FIG. 2 is a block diagram of an exemplary architecture of a sales transaction hub from the sales transaction processing system of FIG. 1.

FIG. 2 is a block diagram of an exemplary architecture of the sales transaction hub 120 from the sales transaction processing system 100 of FIG. 1. The sales transaction hub 120 includes a transaction loader module 200, a transaction archive storage repository 205, an event manager module 210, a correlation engine module 215, a persistence manager module 220, a data store 225, a transaction forwarder module 230, and an audit log 235. The transaction loader module 200 may receive un-audited sales transaction documents from the front-end transaction collection systems or from the point of sale systems, order capture systems, or order management systems, such as the channels, brands, or partners 105. In some implementations, all incoming un-audited sales transactions are received in the same format, such as in a RTLOG format, a TLOG format, or a POSLOG format. In other implementations, incoming un-audited sales transactions are received in more than one format, including those mentioned above or others. This can provide flexibility and adaptability, as a new business unit may be added, and sales transactions that originate from the new business unit may be received by the sales transaction hub 120 without having to reprogram a sales generator associated with the new business unit to output sales transactions in a preferred format, for example. In some implementations, the transaction loader module 200 may use a translation sub-module 240 to perform a translation or transformation on the received un-audited sales transaction to convert the sales transaction from the received format to a preferred format, for example. The transaction loader module 200 may store a copy of the received un-audited sales transaction in the transaction archive 205, according to an implementation, and may forward a copy of the un-audited sales transaction to the transaction forwarder module 230.

The transaction forwarder module 230 may receive the un-audited sales transaction document from the transaction loader module 200, and may prepare the sales transaction document to be transmitted to systems outside of the sales transaction hub 120, such as the audit system 125 and one or more of the back-end processing systems 115 or partner systems 117. In some implementations, the transaction forwarder 230 may use a translation sub-module 245 to perform a format translation or transformation, if appropriate, based on a format that the receiving system expects. Like the inbound transformation capability, this outbound format transformation capability similarly adds flexibility and adaptability, as new back-end systems 115, partner systems 117, or audit systems 125 may be seamlessly added or included without having to reprogram the added system to accept an unfamiliar format. This can be advantageous, for example, if a business acquires another business, and wishes to quickly integrate the back-end processing systems of the acquired business, which may expect or operate on different formats, into the sales transaction processing system 100. In some implementations, one or more queues may receive the forwarded sales transaction documents from the transaction forwarder module 230 on their way to the receiving systems 115, 117, 125.

The back-end processing systems 115 or partner systems 117 that receive the un-audited sales transactions may then begin performing their specialized functions on the transactions. In this fashion, systems 115, 117 may be updated quickly, so that there is minimal delay from the occurrence of a sales transaction to an updating of the back-end processing system 115, 117. In some implementations, this updating can occur in near-real-time. Similarly, the audit system 125 may begin performing the audit functions on the received un-audited sales transactions. When the audit system 125 finishes performing the audit functions on the sales transaction, it may transmit the audited sales transaction to the sales transaction hub 120. As part of the audit process, the audit system 125 may add content to, delete content from, or modify content within the sales transaction document, such as by setting one or more flags within the sales transaction document, or by adding, deleting, or modifying data within the sales transaction document, according to some implementations. In an implementation, a queue receives the audited sales transactions from the audit system on their way to the sales transaction hub 120.

The audited sales transaction documents may be received by the sales transaction hub 120 in the same way that un-audited transactions are received, and the transaction loader 200 may recognize that it is receiving an audited transaction document and forward the audited transaction to the correlation engine 215, which may perform a correlation process on the audited sales transaction document and the corresponding un-audited sales transaction document. The stored copy of the un-audited sales transaction document may be retrieved from the transaction archive 205, and the audited and un-audited version of the sales transaction may be compared. The correlation engine 215 may identify additions, deletions or modifications to the audited sales transaction document that represent differences from the un-audited sales transaction, and may generate a resultant transaction document and forward it to the transaction forwarder 230, which may then transmit the resultant transaction or the audited transaction to subscribing back-end processing systems 115 or partner systems 117. The resultant transaction document may include information from the audited sales transaction document. In some implementations, the resultant transaction document can include the audited financial data, as well as un-audited information included in the original un-audited transaction (e.g., information may not have been forwarded to the audit system 125 or which was not processed by the audit system 125). In other implementations, the resultant transaction document may include the audited transaction and a list of changes or modifications between the audited and the un-audited transactions. In some implementations, the resultant sales transaction document is the audited sales transaction document. The above descriptions of the resultant transaction are exemplary, and many different possibilities exist.

In this fashion, the back-end processing systems 115 or partner systems 117 may be provided with a resultant transaction that includes the information from the audit process, and may update their processing or record-keeping functions accordingly. By centralizing correlation in the sales transaction hub 120, system simplicity may be realized as separate correlation logic may not be required at each of the back-end processing systems 115 or partner systems 117. Similarly, performance may be improved because each of the back-end systems 115 or partner systems 117 need not correlate the audited transaction with the earlier-received, un-audited transaction because the sales transaction hub 120 may handle the correlation from a central location for all of the systems 115 or partner systems 117. Moreover, many point-to-point connections may be eliminated, as the number of interfaces between target systems and supplying systems may be greatly reduced. In some implementations, the sales transaction hub 120 may continue to store the un-audited transaction document through the end of the financial period. This may be beneficial, for example, if the transaction is re-audited. In these cases, correlation among un-audited, first-audited, second-audited, etc., transactions is possible, and a resultant sales transaction may be provided to the backend or partner systems in each case. In other implementations, the sales transaction hub 120 may not continue to store the un-audited transaction document after the correlation between the un-audited transaction and the audited transaction has been completed.

The correlation engine 215 may forward the audited transaction document, the resultant transaction document, or both to the persistence manager 220, which may store transaction documents in the data store 225 and may update the audit log 235. In an implementation, the audit log may include all sales transactions processed by the sales transaction hub 120. In some implementations, the audit log 235 may be stored in the data store 225. The audit log may provide a history of actions associated with processing sales transactions, and may be accessible for reference. This may be advantageous, for example, for complying with regulations, such as Sarbanes-Oxley regulations. During an inspection or audit of the business, for example, an auditor might access the audit log 235 for a complete history of sales transaction actions. The sales transaction hub 120 may thus provide a centralized control point of accountability for the flow of all sales transactions through the sales transaction processing system 100. The event manager 210 may generally manage the flow of processes within the sales transaction hub 120, including providing instructions to each of the constituent modules within the hub 120.

Figure 3:
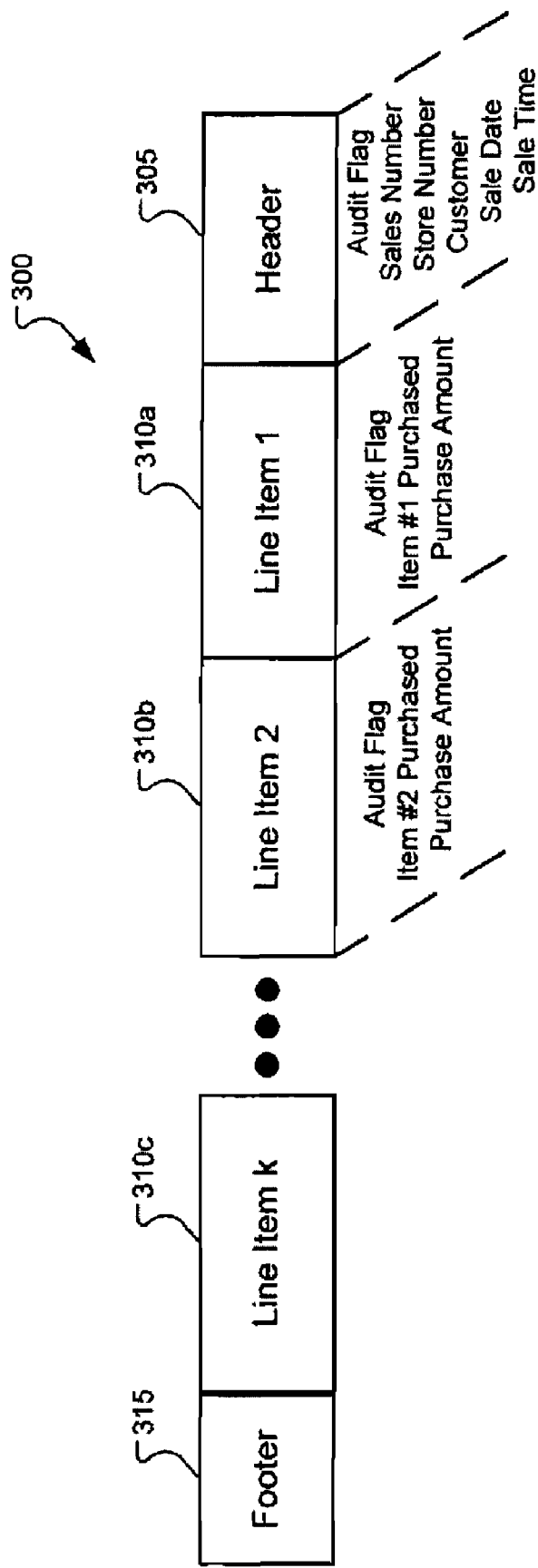
FIG. 3 is a representation of an exemplary sales transaction document.

FIG. 3 is a representation 300 of an exemplary sales transaction document. As described above, sales transactions may be represented in various formats, including, without limitation, POSLOG, RTLOG, and TLOG, to list just a few examples. The representation 300 shown in FIG. 3 is a simplified version of a generic sales transaction document format. The sales transaction document 300 may include a header 305, one or more line items 310, and a footer 315. The header 305 may include one or more audit flags, a sales number, a store number, a customer identification field, a sale date, a sale time, among others. Each of the one or more line items 310 may correspond, according to an implementation, to a particular item purchased as part of the transaction. For example, referring again to the example described above with reference to FIG. 1, line item 1 (310*a*) may correspond to the plasma television, line item 2 (310*b*) may correspond to the home theater speakers, and so on. Each of the line items 310 may include, for example, one or more audit flags, a description of the purchased item, and a purchase amount, among others. In an implementation, the audit flags may be cleared for un-audited sales transactions. The audit flags may be set by the audit system 125, for example, and may be recognized by the correlation engine 215 of the sales transaction hub 120 during the correlation process, according to an implementation. The footer may include termination information.

Figure 4:
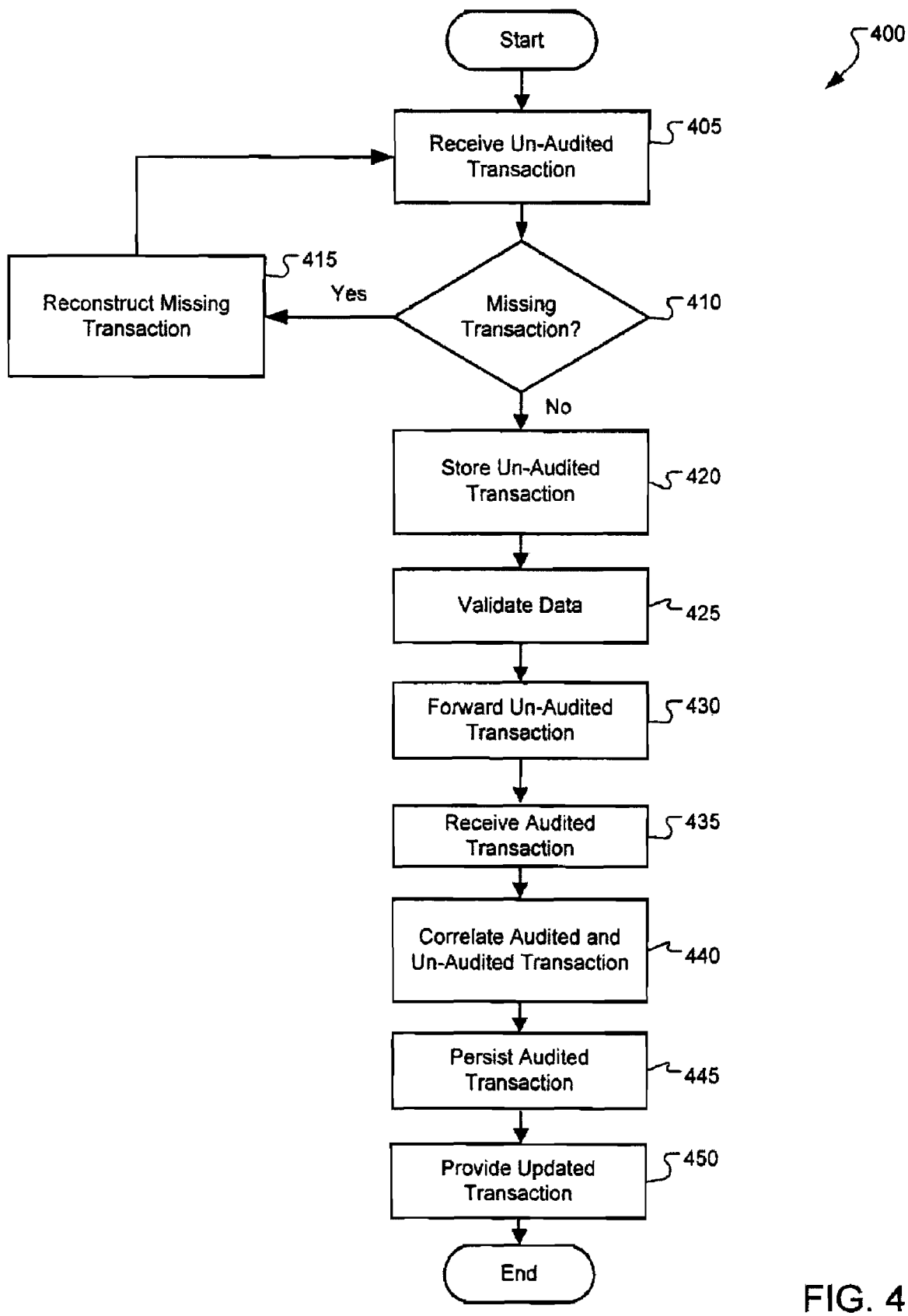
FIG. 4 is a flow chart of exemplary operations that can be performed by the sales transaction hub of FIGS. 1-2.

FIG. 4 is a flow chart 400 of exemplary operations that can be performed by the sales transaction hub 120 of FIGS. 1-2. At step 405, an un-audited transaction document may be received. For example, an un-audited sales transaction document may be received by the transaction loader 200 from a front-end transaction collection system. At step 410, the received transaction may be assessed to determine whether one or more transactions are missing. For example, a transaction number within the sales transaction document may be compared against a list of transaction numbers for previously received transactions. In an implementation, if the transaction number of the newly received transaction document follows consecutively from the number of the most-recently-received transaction document, then there is not a missing transaction and a copy of the un-audited sales transaction document may be stored to a memory location at step 420. If the transaction number of the newly received transaction does not follow consecutively from the number of the most-recently-received transaction at step 410, this may indicate that there is a missing transaction, and the missing transaction may be reconstructed at step 415. This can occur in several ways. For example, the sales transaction hub 120 can query an electronic journal of stored information pertaining to generated sales transactions, extract the pertinent information relating to the missing transaction, and generate a substitute transaction document to replace the missing un-audited transaction. The substitute transaction document can then be received at step 405. In some implementations, the reconstruction step 415 may be performed by another system, such as by the audit system 125. The reconstructed transaction document can then be processed in similar fashion as other un-audited transaction documents.

The un-audited transaction document may have its data validated at step 425. This can include, in some implementations, checking to see that all required fields of the sales transaction document have been populated, and performing a date check. Data validation can also include various data checks, such as checking that text has not been entered into a non-text field, for example. One or more copies of the un-audited transaction document may be forwarded at step 430. For example, the transaction forwarder 230 may forward a copy of the un-audited sales transaction document to the audit system 125 to be audited, and to one or more back-end processing systems 215, which may then begin processing the sales transaction. Some of these back-end processing systems 215 may later receive a copy of an audited version of the sales transaction, but providing them the un-audited transaction at this early stage may permit them to begin processing and update systems that require timely data updates, such as intra-day sales reporting systems and returns systems. This may permit financial reporting and forecasting to be done sooner, even if the data may not be audited yet.

The audit system 125 may revise the un-audited sales transaction document based on the results of the audit. This can include adding one or more line items 310 (FIG. 3) to the transaction document, deleting one or more line items 310 from the transaction document, or modifying one or more line items 310 within the transaction document. In each case, one or more audit flags may be set, either within the transaction header 305, within the line item, or both. In some cases, a new document may be created to represent the audited transaction. The audited transaction document may be received at step 435. For example, the transaction loader 200 may receive the document and forward it to the correlation engine 215, which may perform a correlation process to reconcile the audited transaction document with the corresponding un-audited transaction document (440). This may involve retrieving the stored copy of the un-audited transaction document (stored above in step 420) and comparing the two versions of the transaction, including identifying audit flags that have been set or line items that have been added, modified, or deleted.

The audited transaction may be persisted at step 445. For example, the correlation engine 215 may pass the audited transaction document to the persistence manager 220, which may store the document in the data store 225. In some cases, a transaction may later be re-audited. Having stored copies of earlier-audited versions may enable correlation to be performed when the re-audited transaction is received from the audit system. In this fashion, correlation may facilitate precise record-keeping and accountability. An updated version of the sales transaction document may then be provided at step 450. For example, the transaction forwarder 230 can provide back-end processing systems 115 or partner systems 117 with the updated version so that they can continue processing the sales transaction. In some implementations, the updated version of the sales transaction document is the audited transaction document. In other implementations, the updated version of the transaction includes the audited transaction document and the un-audited transaction document. In yet other implementations, the updated version includes the audited transaction document and an identification of content within the transaction that was modified during the audit. In this fashion, the back-end systems 115 or partner systems 117 may conveniently receive the audited transaction information and may update systems or records as appropriate without having to perform correlations locally. This may reduce complexity as correlation logic need not be replicated at each back-end processing system 115 or partner systems 117.

In some implementations, the sales transaction hub 120 may provide business activity monitoring capabilities, which may include tracking sales, inventory, returns, promotions, and the like.

In some implementations, the sales transaction hub 120 may aggregate received sales transaction documents or sales order documents. For example, with some transactions or orders, a sale generator may generate more than one transaction or order document associated with the transaction or order. For example, a first document may include financial information associated with the transaction or order. A second document may include additional information. In an implementation, the sales transaction hub 120 may receive each document, recognize that they relate to the same transaction or order, and may aggregate them into a single document. In some cases, a format translation may be performed, and the sales transaction hub 120 may provide the aggregated transaction document to back-end systems 115 and/or partner systems 117. In other implementations, the sales transaction hub 120 may provide one of the two related documents to a back-end system 115 or partner system 117, such as if the system 115, 117 subscribes to only one of the documents.

Figure 5:
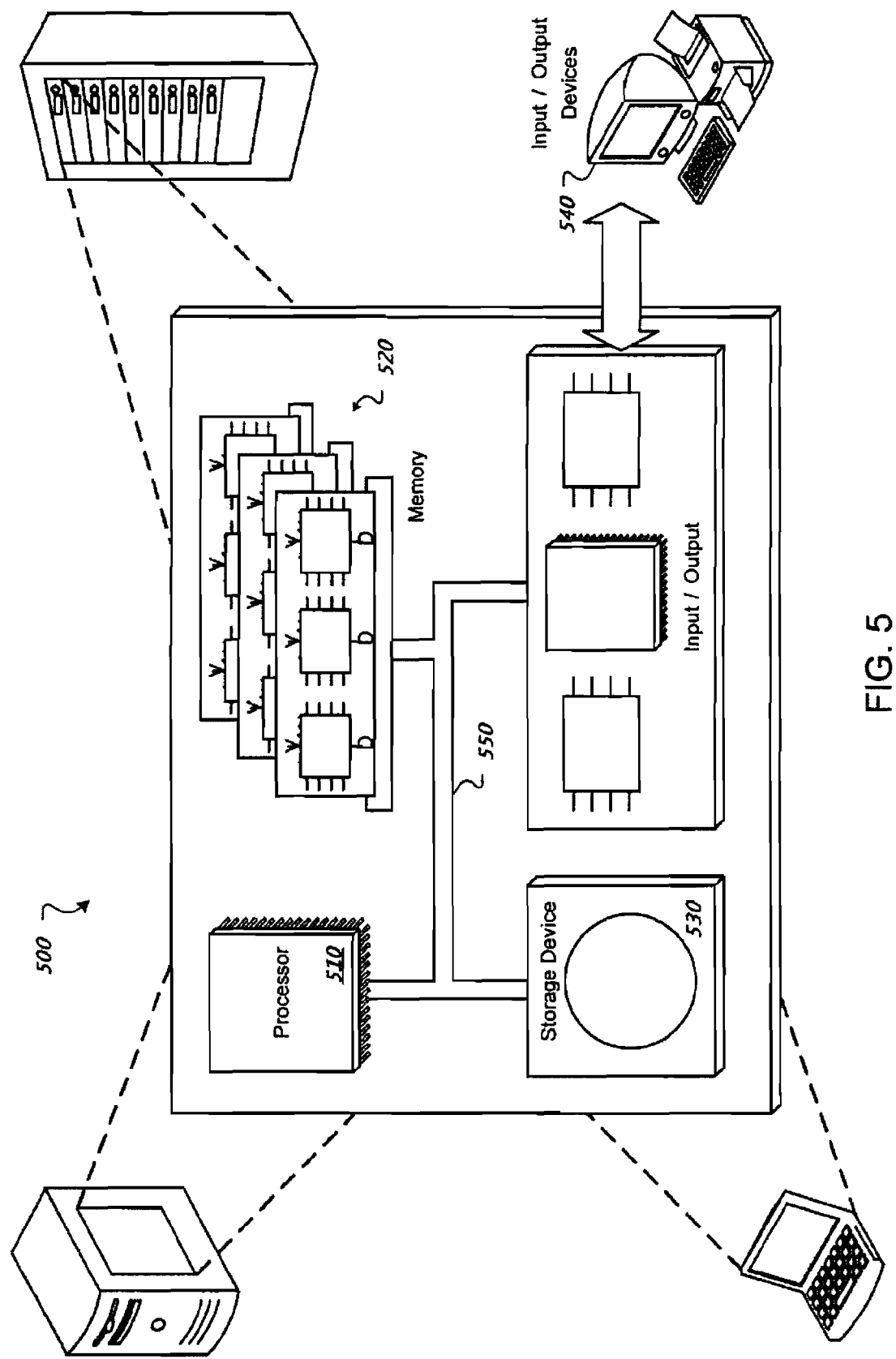
FIG. 5 is a schematic of a general computing system.

FIG. 5 is a schematic of a general computing system 500. The system 500 can be used for the operations described in association with any of the computer-implemented methods described previously, according to an implementation. The system 500 includes a processor 510, a memory 520, a storage device 530, and one or more input/output devices 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Such devices can include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a local area network (LAN), a wide area network (WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Similarly, various components may be combined or separated as appropriate. Accordingly, other implementations are within the scope of the following claims.

What is claimed is:

1. A computer-implemented method of processing a sales transaction by a sales transaction hub, the method comprising:
   receiving an un-audited sales transaction document from a sale generator;
   temporarily storing the un-audited sales transaction document in a memory location and forwarding a first copy of the un-audited sales transaction document to a transaction auditor to begin auditing the first copy of the un-audited sales transaction document and, before the transaction auditor has finished auditing the first copy of the un-audited sales transaction document, forwarding a second copy of the un-audited sales transaction document to a plurality of backend processors to begin processing the second copy of the un-audited sales transaction document;
   receiving from the transaction auditor an audited sales transaction document after forwarding the second copy of the un-audited sales transaction document to the plurality of backend processors, the audited sales transaction document being an audited version of the un-audited sales transaction document;
   responsive to receiving the audited sales transaction document, correlating, using one or more processors, the audited sales transaction document with the temporarily stored un-audited sales transaction document, and generating a resultant sales transaction document that includes information from the audited sales transaction document and information that identifies the second copy of the un-audited sales transaction document that was previously forwarded to the plurality of backend processors; and
   transmitting the resultant sales transaction document to the plurality of backend processors for processing.

2. The computer-implemented method of claim 1, wherein the un-audited sales transaction document includes an identifier that indicates an association between a sales transaction and a business unit.

3. The computer-implemented method of claim 1, further comprising updating an audit log with information pertaining to a sales transaction referenced by the un-audited sales transaction document.

4. The computer-implemented method of claim 1, wherein the un-audited sales transaction document includes fields for information pertaining to a sales transaction.

5. The computer-implemented method of claim 1, wherein un-audited sales transaction documents are received from a plurality of different sales generators.

6. The computer-implemented method of claim 5, wherein each sales generator in the plurality different sales generators is associated with a different business unit.

7. The computer-implemented method of claim 1, further comprising assessing the received un-audited sales transaction document to determine whether one or more sales transaction documents are missing.

8. The computer-implemented method of claim 7, wherein assessing the received un-audited sales transaction document comprises comparing a transaction number associated with the received un-audited sales transaction document with one or more transaction numbers associated with previously received un-audited sales transaction documents.

9. The computer-implemented method of claim 7, further comprising reconstructing a missing un-audited sales transaction document.

10. The computer-implemented method of claim 1, wherein generating the resultant sales transaction document further comprises outputting the audited sales transaction document as the resultant sales transaction document.

11. The computer-implemented method of claim 1, further comprising translating the un-audited sales transaction document from a first format associated with the sales generator to a second format.

12. The computer-implemented method of claim 1, further comprising receiving a second un-audited sales transaction document from the sales generator, determining that the second un-audited sales transaction document is also associated with a sales transaction referenced by the un-audited sales transaction document, and aggregating the un-audited sales transaction document and the second un-audited sales transaction document into a single transaction document.

13. A system for processing a sales transaction for a business, comprising:
   a transaction loader module operable to receive an un-audited sales transaction document, the un-audited sales transaction document generated by an electronic sales generator and associated with a business unit of the business;
   one or more back-end processors capable of receiving a second copy of the un-audited sales transaction document and processing the second copy of the un-audited sales transaction document; and
   a sales transaction hub operable to:
   receive the un-audited sales transaction document from the transaction loader module;
   temporarily store the un-audited sales transaction document in a memory location and forward a first copy of the un-audited sales transaction document to a transaction auditor to begin auditing a first copy of the un-audited sales transaction document and, before the transaction auditor has finished auditing the first copy of the un-audited sales transaction document, forwarding the second copy of the un-audited sales transaction document to the one or more backend processors to begin processing the second copy of the un-audited sales transaction document;

receive from the transaction auditor an audited sales transaction document after forwarding the second copy of the un-audited sales transaction document to the one or more backend processors, the audited sales transaction document being an audited version of the un-audited sales transaction document;

responsive to receiving the audited sales transaction document, correlate the audited sales transaction document with the temporarily stored un-audited sales transaction document, and generate a resultant sales transaction document that includes information from the audited sales transaction document and information that identifies the second copy of the un-audited sales transaction document that was previously forwarded to the plurality of backend processors; and transmit the resultant sales transaction document to the one or more backend processors for processing.

14. The system of claim 13, wherein the sales transaction hub is further operable to update an audit log with information pertaining to a sales transaction referenced by the un-audited sales transaction document.

15. The system of claim 13, wherein the transaction loader module receives un-audited sales transaction documents from a plurality of different sales generators.

16. A computer storage medium encoded with a computer program for processing a sales transaction by a sales transaction hub, the program comprising instructions that when executed by data processing apparatus cause the data processing apparatus to perform operations comprising:

receiving an un-audited sales transaction document from a sale generator;

temporarily storing the un-audited sales transaction document in a memory location and forwarding a first copy of the un-audited sales transaction document to a transaction auditor to begin auditing the first copy of the un-audited sales transaction document and, before the transaction auditor has finished auditing the first copy of the un-audited sales transaction document, forwarding a second copy of the un-audited sales transaction document to a plurality of backend processors to begin processing the second copy of the un-audited sales transaction document;

receiving from the transaction auditor an audited sales transaction document after forwarding the second copy of the un-audited sales transaction document to the plurality of backend processors, the audited sales transaction document being an audited version of the un-audited sales transaction document;

responsive to receiving the audited sales transaction document, correlating the audited sales transaction document with the temporarily stored un-audited sales transaction document, and generating a resultant sales transaction document that includes information from the audited sales transaction document and information that identifies the second copy of the un-audited sales transaction document that was previously forwarded to the plurality of backend processors; and transmitting the resultant sales transaction document to the plurality of backend processors for processing.

17. The method of claim 1, wherein the sales transaction hub comprises a sole interface between the sales generator and the plurality of background processors.

18. The method of claim 1, wherein correlating the audited sales transaction document with the temporarily stored un-audited sales transaction document further comprises identifying additions, deletions, or modifications to the audited sales transaction document.

19. The method of claim 1, wherein the resultant sales transaction document comprises information from the temporarily stored un-audited sales transaction document as well as information from the audited sales transaction document.

20. The method of claim 1, wherein the resultant sales transaction document comprises the audited sales transaction document and a list of changes between the audited sales transaction document and the temporarily stored un-audited sales transaction document.

* * * * *